US009088975B2

(12) United States Patent
Li et al.

(10) Patent No.: US 9,088,975 B2
(45) Date of Patent: Jul. 21, 2015

(54) METHOD AND APPARATUS FOR INTER-PROTOCOL ADAPTATION LAYER PERFORMANCE COORDINATION

(75) Inventors: Guoqing Li, Portland, OR (US); Carlos Cordeiro, Portland, OR (US); Bahareh Sadeghi, Portland, OR (US); Ali S. Sadri, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/996,625

(22) PCT Filed: Dec. 21, 2011

(86) PCT No.: PCT/US2011/066412
§ 371 (c)(1),
(2), (4) Date: May 30, 2014

(87) PCT Pub. No.: WO2013/095421
PCT Pub. Date: Jun. 27, 2013

(65) Prior Publication Data
US 2014/0269543 A1    Sep. 18, 2014

(51) Int. Cl.
*H04W 74/04* (2009.01)
*H04W 28/18* (2009.01)

(52) U.S. Cl.
CPC .............. *H04W 74/04* (2013.01); *H04W 28/18* (2013.01)

(58) Field of Classification Search
CPC ..... H04W 74/04; H04W 84/18; H04W 80/00; H04W 52/0261; H04W 28/18
USPC .......................................... 370/235, 252, 329
See application file for complete search history.

(56) References Cited

U.S. PATENT DOCUMENTS

| 2005/0141478 | A1* | 6/2005 | Ho ................................ 370/350 |
| 2007/0177495 | A1* | 8/2007 | Ametsitsi ...................... 370/208 |
| 2007/0189298 | A1* | 8/2007 | Wong et al. ................. 370/395.1 |
| 2008/0310354 | A1* | 12/2008 | Hansen et al. ................ 370/329 |
| 2009/0019462 | A1* | 1/2009 | Zhang et al. .................. 719/328 |
| 2009/0092123 | A1* | 4/2009 | Aoki ............................. 370/350 |
| 2010/0070665 | A1* | 3/2010 | Swaminathan ............... 710/106 |
| 2010/0153760 | A1 | 6/2010 | Gupta et al. |
| 2010/0153973 | A1* | 6/2010 | Gupta et al. .................. 719/321 |

(Continued)

FOREIGN PATENT DOCUMENTS

WO    2013/095421 A1    6/2013

OTHER PUBLICATIONS

International Search Report and Written Opinion received for PCT Patent Application No. PCT/US2011/066412, mailed on Aug. 29, 2012, 9 pages.

(Continued)

*Primary Examiner* — Gary Mui
*Assistant Examiner* — Michael Phillips
(74) *Attorney, Agent, or Firm* — Ellis B. Ramirez; Prass LLP

(57) ABSTRACT

An approach is provided for coordinating protocol adaptation layer (PAL) performance. The approach involves causing, at least in part, a schedule request message to be sent from a first PAL to a second PAL. The approach also involves causing, at least in part, a schedule response message to be sent from the second PAL to the first PAL. The approach further involves processing the schedule response message to cause, at least in part, a negotiated coordinated schedule between the first PAL and the second PAL.

12 Claims, 5 Drawing Sheets

(56) References Cited

U.S. PATENT DOCUMENTS

| | | | |
|---|---|---|---|
| 2010/0217901 A1* | 8/2010 | Han | 710/106 |
| 2010/0278062 A1* | 11/2010 | Abraham et al. | 370/252 |
| 2011/0158145 A1 | 6/2011 | Gong et al. | |
| 2012/0133827 A1* | 5/2012 | Hsu et al. | 348/441 |
| 2012/0208580 A1* | 8/2012 | Luby et al. | 455/509 |
| 2012/0257642 A1* | 10/2012 | Lee et al. | 370/503 |
| 2013/0136001 A1* | 5/2013 | Mese | 370/235 |

OTHER PUBLICATIONS

International Preliminary Report on Patentability and Written Opinion received for PCT Patent Application No. PCT/US2011/066412, mailed on Jul. 3, 2014, 6 pages.

* cited by examiner

METHOD AND APPARATUS FOR INTER-PROTOCOL ADAPTATION LAYER PERFORMANCE COORDINATION

BACKGROUND

Service providers and device manufacturers are continually challenged to deliver value and convenience to consumers by, for example, providing compelling network services. One area of interest involves system performance and power management optimization in 60 GHz communication systems. According to current 60 GHz communication standards such as the Wireless Gigabit Alliance (WiGig), protocol adaptation layers (PAL) serve as processing agents that are designed to optimize the performance for specific applications such as audio and video, USB data and PCIe bus traffics etc. in a 60 GHz communication system. The PALs are layers that are on top of media access control (MAC) and physical (PHY) layers in a network device. Existing PAL protocols do not communicate with one another. The lack of communication and coordination across PALs may result in uncoordinated actions among different applications. The uncoordinated actions may accordingly lead to un-optimized performance of the device.

SOME EXAMPLE EMBODIMENTS

Therefore, there is a need for an approach for optimizing system performance and/or power management by coordinating protocol adaptation layer performance.

According to one embodiment, a method comprises causing, at least in part, a schedule request message to be sent from a first PAL to a second PAL. The method also comprises causing, at least in part, a schedule response message to be sent from the second PAL to the first PAL. The method further comprises processing the schedule response message to cause, at least in part, a negotiated coordinated schedule between the first PAL and the second PAL.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a schedule request message to be sent from a first PAL to a second PAL. The apparatus is also caused to cause, at least in part, a schedule response message to be sent from the second PAL to the first PAL. The apparatus is further caused to process the schedule response message to cause, at least in part, a negotiated coordinated schedule between the first PAL and the second PAL.

According to another embodiment, a computer-readable storage medium carries one or more sequences of one or more instructions which, when executed by one or more processors, cause, at least in part, an apparatus to cause, at least in part, a schedule request message to be sent from a first PAL to a second PAL. The apparatus is also caused to cause, at least in part, a schedule response message to be sent from the second PAL to the first PAL. The apparatus is further caused to process the schedule response message to cause, at least in part, a negotiated coordinated schedule between the first PAL and the second PAL.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

Various embodiments are illustrated by way of example, and not by way of limitation, in the figures of the accompanying drawings.

DESCRIPTION OF SOME EMBODIMENTS

Examples of a method, apparatus, and computer program for optimizing system performance and/or power management by coordinating protocol adaptation layer performance are disclosed. In the following description, for the purposes of explanation, numerous specific details are set forth in order to provide a thorough understanding of the discussed embodiments. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

Figure 1:
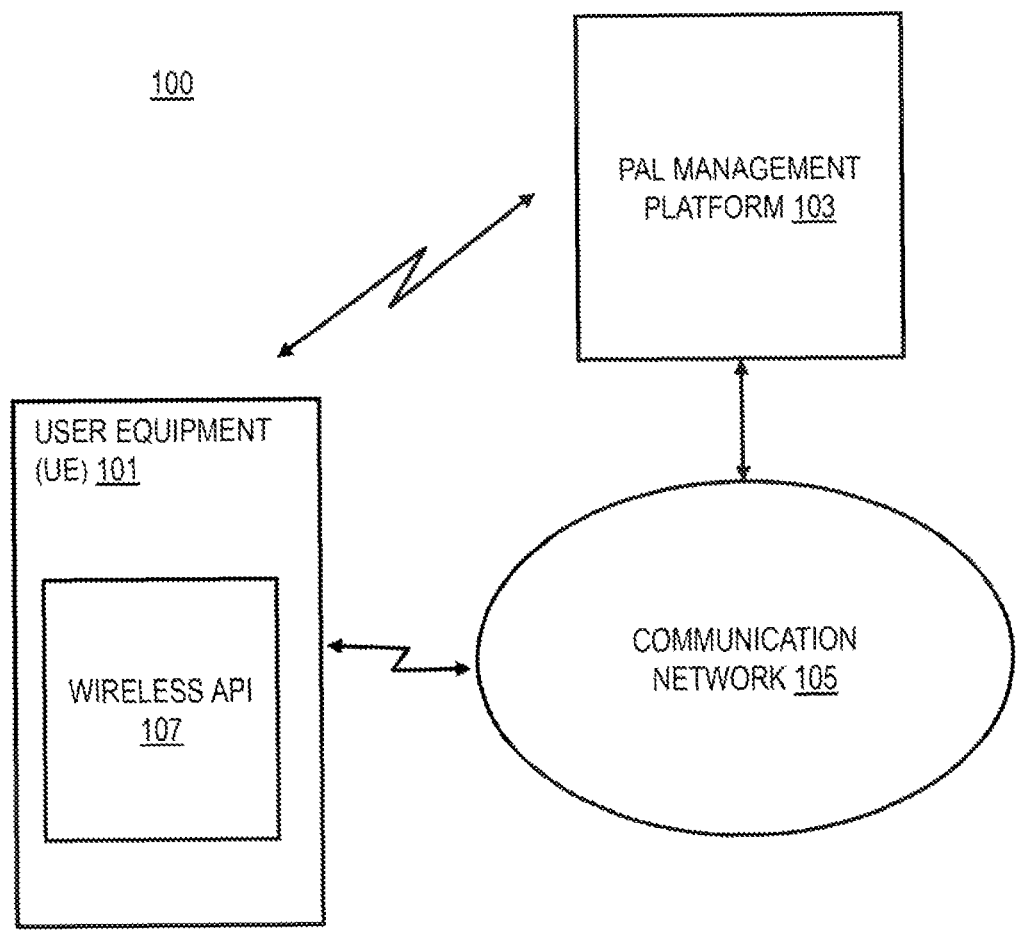
FIG. 1 is a diagram of a system capable of optimizing system performance and/or power management by coordinating protocol adaptation layer performance, according to one embodiment.

FIG. 1 is a diagram of a system capable of optimizing system performance and/or power management by coordinating protocol adaptation layer performance, according to one embodiment.

The Wireless Gigabit Alliance (WiGig) version 1.0 specification, published July 2010, and beyond allows devices to communicate without wires at multi-gigabit speeds. For example, the WiGig specification supports data transmission rates up to 7 Gbps which is more than 10 times faster than the highest conventional 802.11n rate. The WiGig specification supplements and extends the 802.11 Medium Access Control (MAC) layer and is backward compatible with the IEEE 802.11 standard, published Jun. 12, 2007, and beyond. WiGig tri-band enabled devices, for example, which operate in the 2.4, 5 and 60 GHz bands, are capable of delivering data transfer rates up to 7 Gbit/s.

A physical layer (PHY) in the WiGig specification enables both low power and high performance WiGig devices, and guarantees interoperability and communication at gigabit rates. The WiGig specification enables high performance wireless data, display and audio applications that supplement the capabilities of today's wireless LAN devices.

Protocol adaptation layers (PAL) are being developed to support specific system interfaces including data buses for PC peripherals and display interfaces for HDTVs, monitors and projectors. For example, in addition to the MAC layer in a WiGig 60 GHz system, multiple adaptation layers exist in order to support different type of applications which may include any combination of:

Audio/video for wireless display through the WiGig Display Extension (WDE);

Uniform Serial Bus (USB) traffic through the WiGig Serial Extension (WSE);

Peripheral Component Interconnect Express (PCIe) traffic through the WiGig Bus Extension (WBE);

Secure Digital Input Output (SDIO) traffic through the WiGig SD/SDIO Extension (SDIO PAL); and Other traffic types that WiGig may define in the future.

It should be noted that while this disclosure discusses the WiGig specification and WiGig 60 GHz systems as an example, the various embodiments of this disclosure may also be applicable to any underlying radio system involving multiple PALs. Accordingly, the methods, apparatuses and systems discussed should not be limited to WiGig 60 GHz systems.

Each PAL may include various features to optimize the transmission for particular respective traffic based on application characteristics. In conventional systems, PALs do not communicate with one another. The lack of communication and coordination across PALs may lead to un-optimized performance.

For example, consider WSE (USB PAL) and WDE (A/V PAL) and use power consumption as a performance metric. In general, WDE and WSE traffic are independent and it is likely that the MAC/PHY will have to be in a wakeup state when either there is WSE traffic or WDE traffic in a MAC queue. Such independent performance can lead to frequent transitions between wakeup and sleep states, which leads to increased power consumption, and un-optimized system performance.

Accordingly, there is a need to optimize system performance and/or power management by coordinating protocol adaptation layer performance. For instance, with regard to the example discussed above, it may be desirable for the WDE and WSE modules to have an intelligent coordination and operation such that the MAC can sleep longer and the frequency of transitions between wakeup and sleep states is minimized, which in turn may lead to reduced power consumption.

To address this problem, a system 100 of FIG. 1 introduces the capability to optimize system performance and/or power management by coordinating protocol adaptation layer performance.

According to various embodiments, the system 100 may cause any number of PALs to communicate with one another to coordinate an optimal performance schedule to maximize various performance metrics such as, but not limited to, power consumption, as discussed above.

Considering the above example referring to WSE (USB PAL) and WDE (A/V PAL) communication using power consumption as a performance metric, the traffic specification (e.g., similar to the TSPEC in IEEE 802.11) of WDE and WSE may be communicated to one another. Each PAL can take other PAL information into account during its operation. For example, WDE can change parameters of its traffic flows, including burst size and inter-interval time, such that they have similar characteristics as that of WSE traffic. This way, both WSE and WDE will have traffic with approximately the same pattern, which will enable the MAC to schedule these traffics into one or multiple adjacent service periods and sleep longer during other times.

The communication and coordination between PALs can be in the form of different messages such as:

Information request: in this message, a PAL (requestor) requests another PAL (responder) to align its traffic schedule with its own schedule. The message may include the schedule (e.g., similar to the TSPEC in IEEE 802.11) of the first PAL to the second PAL.

Information response: in this message, the responder responds to the requestor confirming the alignment, or rejecting the alignment, or proposing an alternative alignment. The Information Response message may also include the schedule of the second PAL.

The system 100 may also enable multiple information request and information response exchanges between a pair of PALs, or a plurality of PALs if the MAC is attempting to optimize the performance of many PALs together, until either an agreement is reached or the process is stopped.

The communication and coordination between PALs may take place in an initiation stage (e.g., upon initiation of a new traffic flow), may be triggered periodically, or may be trigger based on certain events. For example, if the platform power has reduced to a threshold, then the communication between PALs can be triggered and each PAL can take actions accordingly to minimize the overall power. Other events may include, for example, traffic burst detection, or a change in operating state such as sleep mode, wake mode, power save mode, reduction in process speed, etc.

As shown in FIG. 1, the system 100 comprises a user equipment (UE) 101 having connectivity to a PAL management platform 103 which may be onboard the UE 101 or connected via a communication network 105. The UE 101 may also comprise a wireless application programming interface (API) 107 that may be a mean for the UE 101 to communicate with other devices over the WiGig 60 GHz standard as discussed above, or any other radio standard, by way of the communication network 105, for example.

By way of example, the communication network 105 of system 100 includes one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, other UE 101's, and PAL management platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
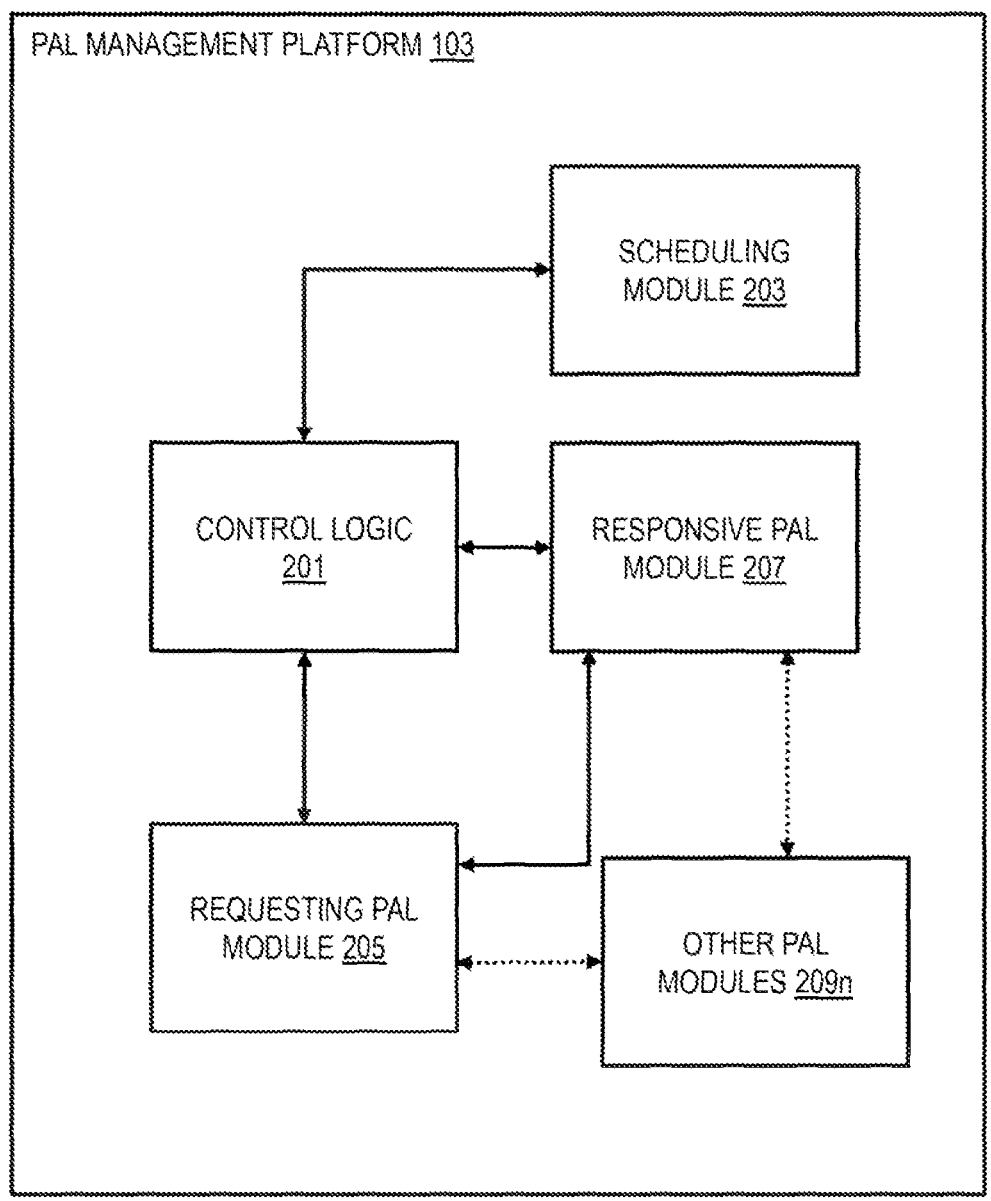
FIG. 2 is a diagram of the components of PAL management platform, according to one embodiment.

FIG. 2 is a diagram of the components of the PAL management platform 103, according to one embodiment. By way of example, the PAL management platform 103, which may itself be considered to correspond to the MAC layer discussed above, includes one or more components for providing optimal system performance and/or power management by coordinating protocol adaptation layer performance. It is contemplated that the functions of these components may be combined in one or more components or performed by other components of equivalent functionality. In this embodiment, the PAL management platform 103 includes a control logic 201, a scheduling module 203, a requesting PAL module 205, a responsive PAL module 207, and any number of other PAL modules 209n.

As discussed above, each PAL may include various features to optimize the transmission for particular respective traffic based on application characteristics. For instance, PALs may include audio/video for wireless display through the WDE, USB traffic through the WSE, PCIe traffic through the WBE, SDIO traffic through the SDIO PAL, or other traffic types that WiGig may define in the future.

Considering again the example discussed above using WSE (USB PAL) and WDE (A/V PAL) and using power consumption as a performance metric, the PAL management platform 103 enables the WDE and WSE modules to have an intelligent performance schedule coordination and operation such that the MAC can sleep longer to reduce the frequency of transitions between wakeup and sleep states, which in turn may lead to reduced power consumption.

The control logic 201, or the requesting PAL module 205, may determine that there is a need to cause the WSE to coordinate its traffic schedule with the WDE. Accordingly, in this example, the WSE may be represented by the requesting PAL module 205 and the WDE may be represented by the responsive PAL module 207. In other embodiments, the requesting PAL module 205, responsive PAL module 207, and other PAL modules 209n may be representative of any combination of the example PALs discussed above. For simplicity, the following discussion will be directed to communications between the requesting PAL module 205 and the responsive PAL module 207, but various embodiments may enable any number of PAL modules including, for example, other PAL modules 209n.

The control logic 201 instructs the requesting PAL module 205 to send a schedule request message to the responsive PAL module 207. Alternatively, the requesting PAL module 205 may initiate the schedule request message on its own. The traffic specification of the requesting PAL module 205 and the responsive PAL module 207 may be communicated to one another. Each PAL module can take other PAL module information into account during its operation. For example, requesting PAL module 205 can change parameters of its traffic flows, including burst size and inter-interval time, such that they have similar characteristics as that of responsive PAL module 207 traffic. This way, both requesting PAL module 205 and responsive PAL module 207 will have traffic with approximately the same pattern, which will enable the control logic 201 to instruct the scheduling module 203 to schedule these traffics into one or multiple adjacent service periods and enable longer sleep periods during other times. Alternatively, the PAL modules may implement a coordinated schedule without going through the scheduling module 203.

In one or more embodiments, the requesting PAL module 205 may send a request message to the responsive PAL module 207 to align its traffic schedule with its own schedule. The responsive PAL module 207 may send a response message to the requesting PAL module 205 and/or the scheduling module 203. In this message, the responsive PAL module 207 may respond to the requesting PAL module 205 confirming the alignment, or rejecting the alignment, or proposing an alternative alignment of each PAL's respective performance schedules. The response message may also include the schedule of the responsive PAL module 207.

The control logic 201, in the event of a rejection, conflict or alternative suggested schedule may cause a negotiation session to occur between the requesting PAL module 205 and the responsive PAL module 207, or the control logic 201 may instruct the scheduling module 203 to conduct the negotiation session to determine the optimum schedule for the various PALs to align their respective traffic and performance. Request and response exchanges between any pair of PAL modules, or a plurality of PAL modules, may continue in the negotiation session until either an agreement is reached or the process is stopped. Alternatively, the negotiation session may also be conducted through direct communication between the requesting PAL module 205 and the responsive PAL module 207 without the scheduling module 203 as a mediator.

Figure 3:
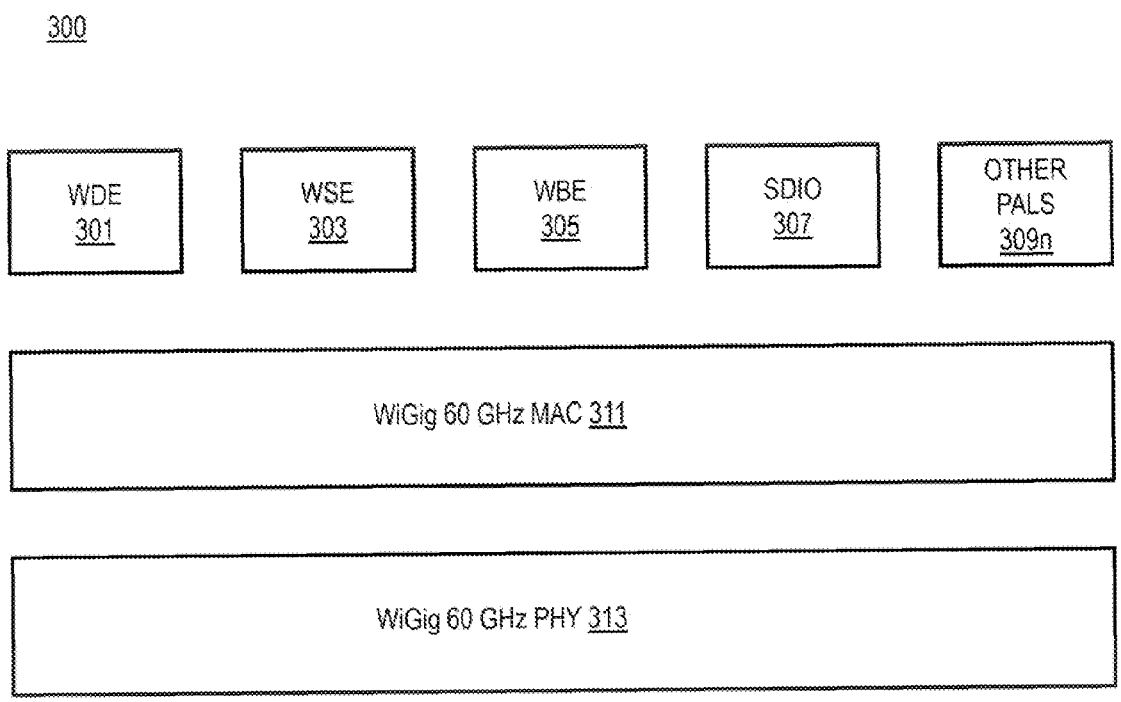
FIG. 3 is a diagram of a WiGig system having multiple PALs, according to one embodiment.

FIG. 3 is a block diagram of a WiGig 60 GHz system 300 in which various PAL's such as WDE 301, WSE 303, WBE 305, SDIO 307 and any other PAL's 309n may communicate with one another directly, or by way of the PAL management platform 103 discussed above, according to one embodiment. To optimize system performance, the WiGig MAC 311 may enable the PAL's to communicate with one another to negotiate and align their performance schedules on their own, or in coordination with the MAC 311. The MAC 311 conventionally has to be in a wakeup state along with the WiGig PHY 313 for any PAL traffic to occur. Accordingly, to conserve power, and to optimize system performance, the MAC 311 may instruct the PAL's to align their performance schedules to minimize wake time transitions for both the MAC 311 and PHY 313, along with any other PAL's that may randomly be performing functions on their own independent schedules.

Figure 4:
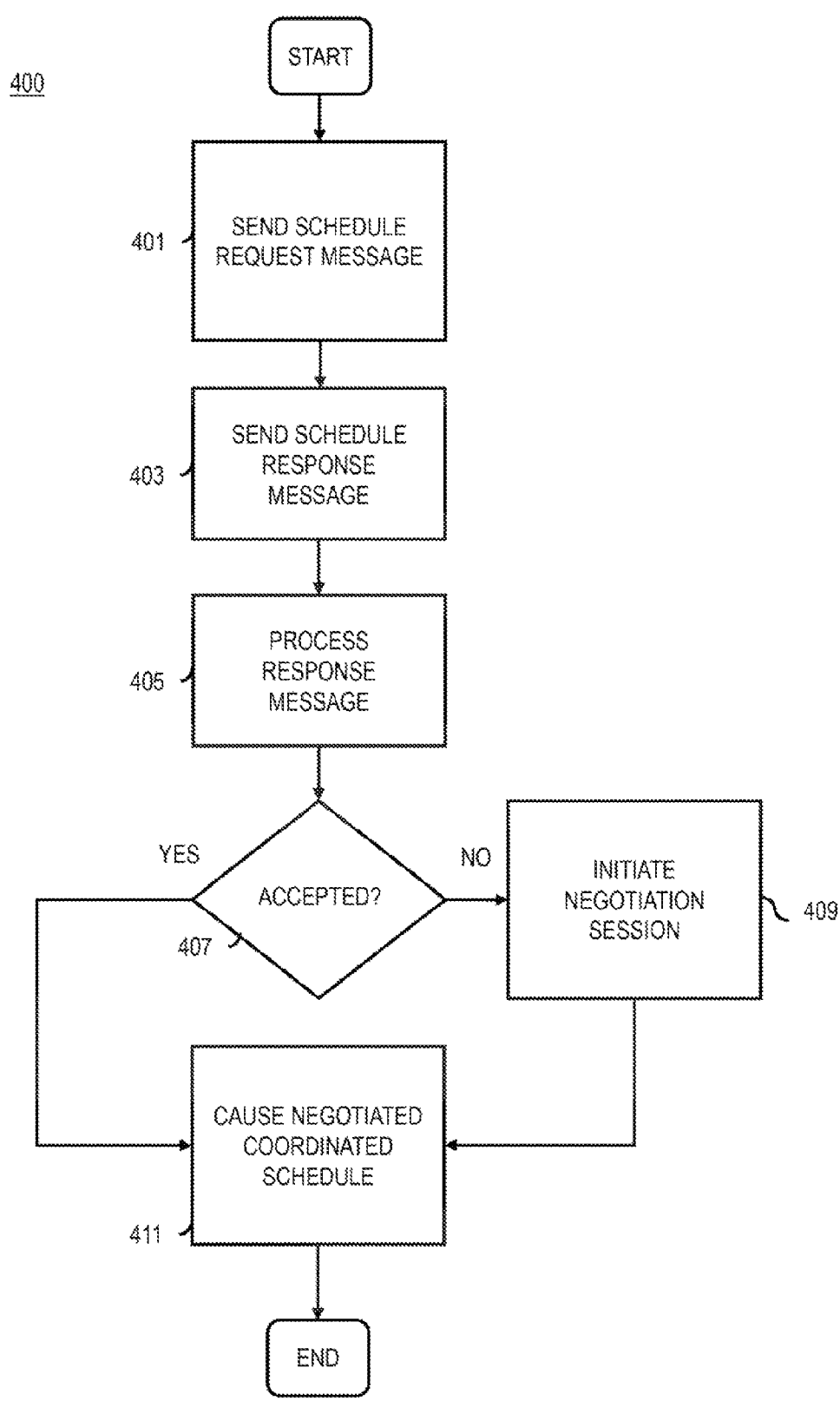
FIG. 4 is a flowchart of a process for optimizing system performance and/or power management by coordinating protocol adaptation layer performance, according to one embodiment.
Figure 5:
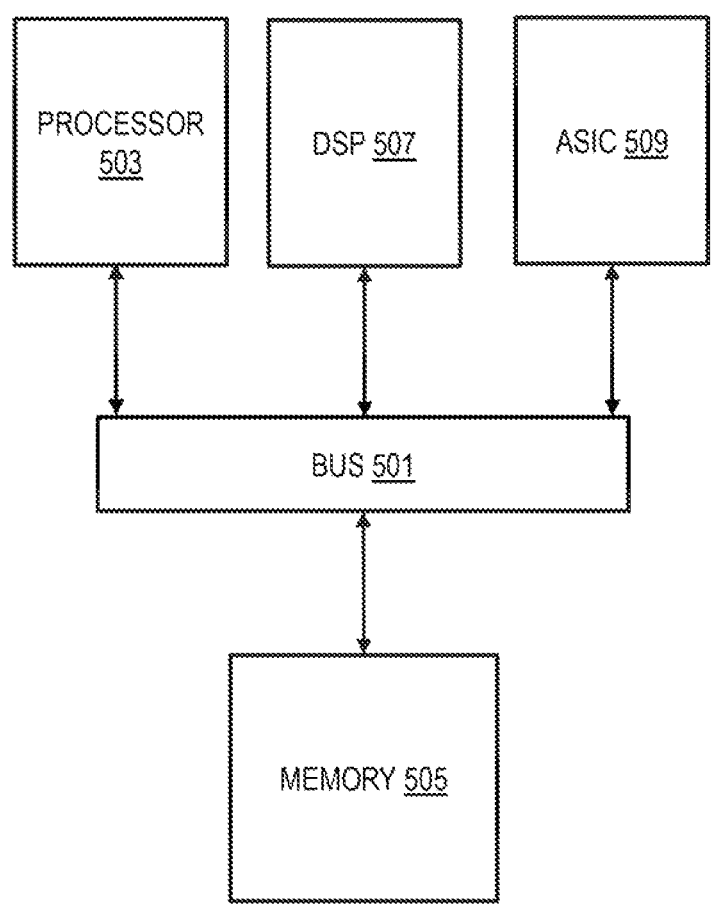
FIG. 5 is a diagram of a chip set that can be used to implement an example embodiment.

FIG. 4 is a flowchart of a process for optimizing system performance and/or power management by coordinating protocol adaptation layer performance, according to one embodiment. In one embodiment, the PAL management platform 103 performs the process 400 and is implemented in, for instance, a chip set including a processor and a memory as shown in FIG. 5. In step 401 the PAL management platform 103 causes, at least in part, a schedule request message which may include a schedule of the first PAL to be sent from a first PAL to a second PAL. For example, the WSE 303 to the WDE 301.

Then, in step 403, the PAL management platform 103 causes, at least in part, a schedule response message to be sent from the second PAL to the first PAL. For example, the WDE 301 to the WSE 303. According to various embodiments, the schedule request message may be sent for any reason, such as at a predetermined time interval, or based, at least in part, on a determined trigger comprising one or more of a detected change of traffic flow, power condition, or operating state, for example.

The process continues to step 405 in which the first PAL processes the response message which may include and acceptance of a coordinated schedule based on the schedule of the first PAL, the schedule of the second PAL, a suggested coordinated schedule, or a rejection of the request to coordinate schedules. Next, in step 407, the first PAL determines to accept schedule in the response message, if not rejected, to cause, at least in part, an acceptance of the suggested coordinated schedule. If the coordinated schedule indicated in the response message is accepted, the process skips to step 411 in which a negotiated coordinated schedule between the first PAL and the second PAL is based on the accepted coordinated schedule which may be an affirmation of the request, or an alternative suggestion from the second PAL.

Alternatively, if the schedule suggested in the response message is not accepted, then the process continues to step 409 in which the first PAL determines to send another schedule request message from the first PAL to the second PAL in response to the suggested coordinated schedule which may be based on the second PAL's schedule or an alternative to initiate a negotiation session between the first PAL and the second PAL. The negotiation session may cause another schedule response message to be sent from the second PAL to the first PAL having another suggested coordinated schedule. In one or more embodiments, the negotiation session may be handled by the PAL management platform 103 in the scheduling module 203 in a case where a plurality of PAL schedules are being optimized, or the negotiation session should be mediated, for example.

Upon completion of the negotiation session, so long as an agreement is reached, the process continues to step 411 in which the negotiated coordinated schedule is set based, at least in part, on an outcome of the negotiation session.

The processes described herein for optimizing system performance and/or power management by coordinating protocol adaptation layer performance may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 5 illustrates a chip set or chip 500 upon which an embodiment may be implemented. Chip set 500 is programmed to optimize system performance and/or power management by coordinating protocol adaptation layer performance as described herein may include, for example, bus 501, processor 503, memory 505, DSP 507 and ASIC 509 components.

The processor 503 and memory 505 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 500 can be implemented in a single chip. It is further contemplated that in certain embodiments the chip set or chip 500 can be implemented as a single "system on a chip." It is further contemplated that in certain embodiments a separate ASIC would not be used, for example, and that all relevant functions as disclosed herein would be performed by a processor or processors. Chip set or chip 500, or a portion thereof, constitutes a means for performing one or more steps of optimizing system performance and/or power management by coordinating protocol adaptation layer performance.

In one or more embodiments, the chip set or chip 500 includes a communication mechanism such as bus 501 for passing information among the components of the chip set 500. Processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one or more embodiments, the processor (or multiple processors) 503 performs a set of operations on information as specified by computer program code related to optimizing system performance and/or power management by coordinating protocol adaptation layer performance. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 501 and placing information on the bus 501. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 503, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 503 and accompanying components have connectivity to the memory 505 via the bus 501. The memory 505 may include one or more of dynamic memory (e.g., RAM, magnetic disk, writable optical disk, etc.) and static memory (e.g., ROM, CD-ROM, etc.) for storing executable instructions that when executed perform the inventive steps described herein to optimize system performance and/or power management by coordinating protocol adaptation layer performance. The memory 505 also stores the data associated with or generated by the execution of the inventive steps.

In one or more embodiments, the memory 505, such as a random access memory (RAM) or any other dynamic storage device, stores information including processor instructions for optimizing system performance and/or power management by coordinating protocol adaptation layer performance. Dynamic memory allows information stored therein to be changed by system 100. RAM allows a unit of information stored at a location called a memory address to be stored and retrieved independently of information at neighboring addresses. The memory 505 is also used by the processor 503 to store temporary values during execution of processor instructions. The memory 505 may also be a read only memory (ROM) or any other static storage device coupled to the bus 501 for storing static information, including instructions, that is not changed by the system 100. Some memory is composed of volatile storage that loses the information stored thereon when power is lost. The memory 505 may also be a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 503, including instructions for execution. Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the invention is not so limited but covers various obvious modifications and equivalent arrangements, which fall within the purview of the appended claims. Although features of various embodiments are expressed in certain combinations among the claims, it is contemplated that these features can be arranged in any combination and order.

What is claimed is:

1. A method comprising:
   causing, at least in part, a schedule request message to be sent from a first protocol adaptation layer (PAL) to a second PAL, wherein the first PAL and the second PAL are located within the same network device;
   causing, at least in part, a schedule response message to be sent from the second PAL to the first PAL;
   processing the schedule response message to cause, at least in part, a negotiated coordinated schedule between the first PAL and the second PAL;
   wherein the schedule request message comprises a schedule of the first PAL;
   wherein the schedule response message comprises a confirmation message indicating that the negotiated coordinated schedule is based on the schedule of the first PAL, or the schedule response message comprises a rejection of a coordinated schedule request based on the schedule of the first PAL and the schedule response message further comprises a suggested coordinated schedule; and
   wherein to conserve power and to optimize performance a medium access control (MAC) layer coordinates with PALs to align performance schedules for the PALs to minimize wake time transitions for the MAC layer and a physical (PHY) layer.

2. The method of claim 1, further comprising:
   processing the suggested coordinated schedule to cause, at least in part, an acceptance of the suggested coordinated schedule, wherein the negotiated coordinated schedule is based on the suggested coordinated schedule.

3. The method of claim 1, further comprising:
   determining to send another schedule request message from the first PAL to the second PAL in response to the suggested coordinated schedule to initiate a negotiation session to cause, at least in part, another schedule response message having another suggested coordinated schedule,
   wherein the negotiated coordinated schedule is based, at least in part, on an outcome of the negotiation session.

4. The method of claim 1, wherein the schedule response message comprises a schedule of the second PAL.

5. The method of claim 1, wherein the schedule request message is sent at a predetermined time interval.

6. The method of claim 1, wherein the schedule request message is sent based, at least in part, on a determined trigger comprising one or more of a detected change of traffic flow, power condition, or operating state.

7. An apparatus comprising:

at least one processor; and at least one memory including computer program code for one or more programs, the at least one memory and the computer program code configured to, with the at least one processor, cause the apparatus to perform at least the following, cause, at least in part, a schedule request message to be sent from a first protocol adaptation layer (PAL) to a second PAL, wherein the first PAL and the second PAL are located within the same network device;

cause, at least in part, a schedule response message to be sent from the second PAL to the first PAL;

process the schedule response message to cause, at least in part, a negotiated coordinated schedule between the first PAL and the second PAL, wherein the first PAL and the second PAL are located within the same network device;

wherein the schedule request message comprises a schedule of the first PAL;

wherein the schedule response message comprises a confirmation message indicating that the negotiated coordinated schedule is based on the schedule of the first PAL, or the schedule response message comprises a rejection of a coordinated schedule request based on the schedule of the first PAL and the schedule response message further comprises at least one of a schedule of the second PAL and a suggested coordinated schedule; and wherein to conserve power and to optimize performance a medium access control (MAC) layer coordinates with PALs to align performance schedules for the PALs to minimize wake time transitions for the MAC layer and a physical (PHY) layer.

8. The apparatus of claim 7, wherein the apparatus is further caused to:

process the suggested coordinated schedule to cause, at least in part, an acceptance of the suggested coordinated schedule, wherein the negotiated coordinated schedule is based on the suggested coordinated schedule.

9. The apparatus of claim 7, wherein the apparatus is further caused to:

determine to send another schedule request message from the first PAL to the second PAL in response to the suggested coordinated schedule to initiate a negotiation session to cause, at least in part, another schedule response message having another suggested coordinated schedule, wherein the negotiated coordinated schedule is based, at least in part, on an outcome of the negotiation session.

10. The apparatus of claim 7, wherein the schedule request message is sent based, at least in part, on a determined trigger comprising one or more of a detected change of traffic flow, power condition, operating state, or predetermined time interval.

11. A non-transitory computer-readable storage medium carrying one or more sequences of one or more instructions which, when executed by one or more processors, cause an apparatus to at least perform the following, cause, at least in part, a schedule request message to be sent from a first protocol adaptation layer (PAL) to a second PAL in a system having multiple PALs;

cause, at least in part, a schedule response message to be sent from the second PAL to the first PAL, wherein the first PAL and the second PAL are located within the same network device;

process the schedule response message to cause, at least in part, a negotiated coordinated schedule between the first PAL and the second PAL;

wherein the schedule request message comprises a schedule of the first PAL;

wherein the schedule response message comprises a confirmation message indicating that the negotiated coordinated schedule is based on the schedule of the first PAL, or the schedule response message comprises a rejection of a coordinated schedule request based on the schedule of the first PAL and the schedule response message further comprises a suggested coordinated schedule; and wherein to conserve power and to optimize performance a medium access control (MAC) layer coordinates with PALs to align performance schedules for the PALs to minimize wake time transitions for the MAC layer and a physical (PHY) layer.

12. The non-transitory computer-readable storage medium of claim 11, wherein the schedule response message comprises a suggested coordinated schedule, the apparatus is further caused to determine to send another schedule request message from the first PAL to the second PAL in response to the suggested coordinated schedule to initiate a negotiation session to cause, at least in part, another schedule response message having another suggested coordinated schedule, and the negotiated coordinated schedule is based, at least in part, on an outcome of the negotiation session.

\* \* \* \* \*